F. Wegmann,

Steam Condenser

No. 106,973. Patented Aug. 30, 1870.

Witnesses: Wm. A. Steel, John Parker

F. Wegmann
by his att'y
H. Howson

United States Patent Office.

FRIEDRICH WEGMANN, OF NAPLES, ITALY.

Letters Patent No. 106,973, dated August 30, 1870.

IMPROVEMENT IN CONDENSERS.

The Schedule referred to in these Letters Patent and making part of the same

*To all whom it may concern:*

Be it known that I, FRIEDRICH WEGMANN, of Naples, Italy, have invented certain new and useful Improvements in Condensers or Condensing Apparatus for Steam-Engines, &c.; and I do hereby declare the following to be a full, clear, and exact description of the same.

My invention relates to a new arrangement of condensing apparatus fully described hereafter, adapted to economize a great portion of the water necessary for the operation of ordinary condensers, and which may furnish distilled water when desired.

The improved condenser may be adapted to engines either alone or in connection with any of the ordinary condensers in use for engines of either high or low pressure.

In order to enable others familiar with apparatus of this class to make and use my invention, I will now proceed to describe its construction and operation, reference being had to the accompanying drawing which forms a part of this specification, and in which—

Figure 1:
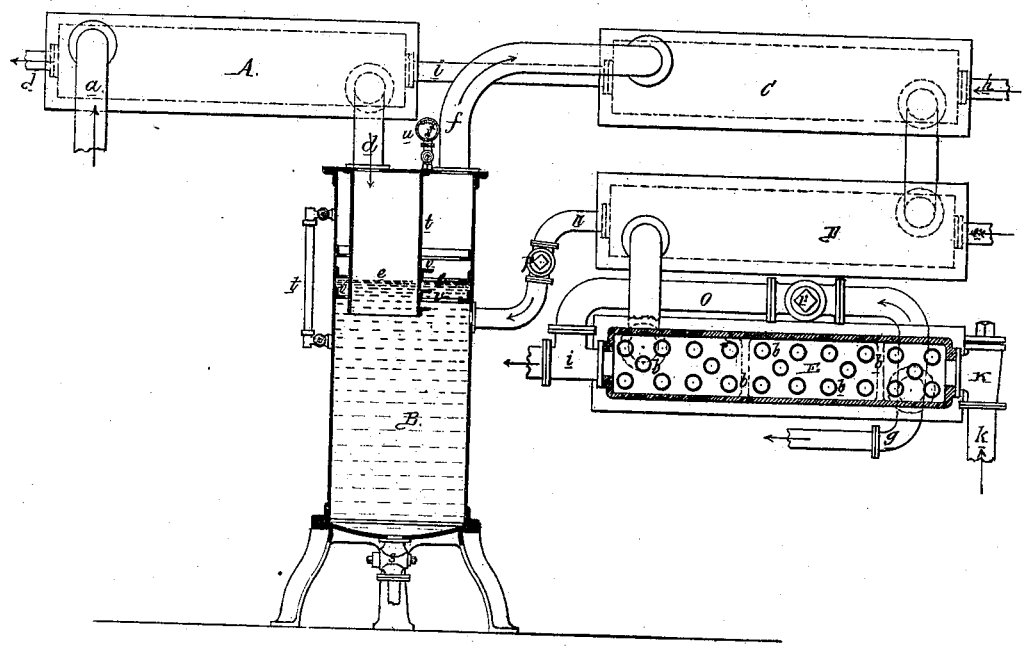

Figure 1 is a view of the condensing apparatus, partly in section, and

Figure 2:
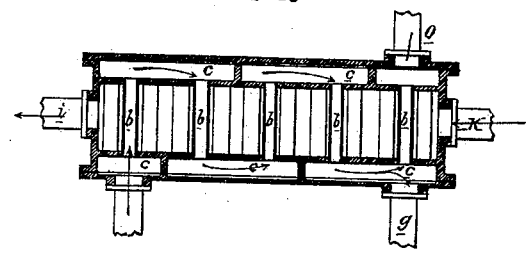

Figure 2, a sectional plan of one of the condensing vessels.

Similar letters refer to similar parts throughout the several views.

The apparatus consists—

First, of a receptacle, A, somewhat analogous to the surface condensers in common use, and which receives directly the exhaust steam of the engine;

Secondly, of a upright cylindrical water-vessel, B, which serves as a washer for the non-condensed steam leaving the first receptacle A; and Thirdly, of a series of receptacles, C D E, precisely similar to the first receptacle A, (see fig. 2,) and in which the steam continues to circulate until completely condensed.

The escape steam first enters the receptacle A through the pipe *a*, and circulates in the interior of the tubes *b*, and in the spaces *c*, which communicate with these tubes, as shown by the arrows in fig. 2.

The steam is then taken through the pipes *d* into a tubular compartment, *t*, at the top of the vessel B, this compartment being open at the bottom, so that the water which is maintained at the level *e* in the outer vessel may also rise to the same height in the said compartment. This forces the steam, in order to penetrate into the vessel B, to traverse a layer of water which deprives it of all impurities.

The water in the vessel B is kept at about a temperature of 80°, so that, by the vacuum, a constant evaporation is produced at its surface, and the steam thus generated passes through the pipe *f*, and traverses, consecutively, the three refrigerating vessels, C, D, and E. It leaves in a liquid state through the pipe *g*, where it can be collected as distilled water, or it may be drawn by the feed-pump of the engine and passed into the vessel C through the pipe *h* to serve as cooling water.

The water, after passing around the tubes in the vessel C, leaves by the pipe *i*, which conducts it into the first receptacle A, where it again serves as cooling water, and finally passes off through the pipe *j*, to be used as feed-water for the boiler.

The pipe K, provided with a cock, *k*, communicates with a well or reservoir of cold water, and this water is drawn through the vessel E, around the pipes *b*, and through the pipe *i* by the air-pump of the ordinary condenser, if the apparatus is provided with a condenser, or by a special air-pump in the contrary case, and this pump throws the same water through the vessel D by the pipes *m*. The water leaves this latter vessel through the pipe *n*, and part of it flows into the vessel B, to compensate for the waste resulting from evaporation, and the other portion is rejected.

Where a sufficiently large quantity of water is not attainable, a current of cold air can be passed into the vessel E with the same result.

The pipe O, furnished with a cock, *r*, communicates at one end with the air-pump, or with the pipe *i*, leading to the same, and at the opposite end with the interior of the tubes *b*. The object of this pipe is to rapidly cause a vacuum in the tubes *b* and spaces *c*, when operating.

When the apparatus is in operation, the cock *r* should be partially closed, a small passage only being required to carry off the air which always remains after the condensation of the steam.

The entry of the water into the vessel B is regulated by the cock *p* on the pipe *n*, and the cock *s* serves to clear this vessel of the impurities deposited therein.

The said vessel B is provided with a water-gauge, level-indicator, *t*, and with a vacuum-gauge, *u*, and has also in it interior guides *v*, to hinder oscillation on the surface of the water, and to thus facilitate evaporation.

With this apparatus the following advantages are obtained:

The boiler is fed with distilled water, and consequently incrustations are avoided, and the use of this feed-water at a high temperature, with a sufficient vacuum behind the piston, effects considerable economy of fuel.

I claim as invention and desire to secure by Letters Patent—

1. The condensing receptacles A, C, and D, in combination with the vessel B, arranged between and communicating with the said receptacles, as described.

2. The compartment or casing *t*, secured to the top of the vessel B, when its lower open end extends downward to a point beneath the water level in the said vessel.

3. The projections or guides $v$, arranged at about the water level within the vessel B, for the purpose specified.

4. The arrangement, substantially as herein described, in respect to each other and to the vessel B, of the receptacles A, C, D, and E.

In testimony whereof I have signed my name to this specification in the presence of two subscribing witnesses.

FRIEDRICH WEGMANN.

Witnesses:
F. OLCOTT,
G. A. HIRZEL.